Inventors:
Lee H. Dierdorff, Jr.
Joseph H. Kosciolek
BY Milton Zucker
Robert E. Patridge
Attorneys United States Patent Office 3,655,698
Patented Apr. 11, 1972

3,655,698
EPOXIDATION OF SOYBEAN OIL
Lee H. Dierdorff, Jr., Princeton, N.J., and Joseph H. Kosciolek, Manlius, N.Y., assignors to FMC Corporation, New York, N.Y.
Continuation of application Ser. No. 328,809, Dec. 9, 1963. This application Aug. 15, 1967, Ser. No. 667,312
Int. Cl. C07d 1/10
U.S. Cl. 260—348.5 V                    1 Claim

ABSTRACT OF THE DISCLOSURE

This application discloses a method of increasing the oxygen content of oxidizable organic materials by contacting the oxidizable organic material with a vaporous effluent containing 5%, by weight, of peracetic acid coming directly from a peracetic acid generator. The method is useful in epoxidizing ethylenically unsaturated organic compounds and in bleaching liquids, textiles and wood pulp.

CROSS-REFERENCE TO RELATED APPLICATIONS

This application is a continuation of application Ser. No. 328,809, filed Dec. 9, 1963, now abandoned.

BACKGROUND OF THE INVENTION

(A) Field of the invention

This invention relates to a novel method of oxidizing organic materials with preformed peracetic acid.

(B) Description of the prior art

Oxidation reactions involving peracetic acid, such as the epoxidation of unsaturated organic compounds, are conventionally carried out in the liquid phase using preformed peracetic acid or peracetic acid formed in situ during the oxidation reaction. The in situ technique was for many years considered to be the most economical method of oxidizing organic compounds with peracetic acid. However, this technique is not suitable for the oxidation of many organic compounds since it requires the use of a strong acid catalyst which attacks the oxidation product. Thus, with the recent development of more economical methods of preparing peracetic acid, the preformed peracetic acid technique is becoming the most widely used method of oxidizing organic materials with peracetic acid.

Preformed peracetic acid was traditionally prepared by the reaction of acetic acid and hydrogen peroxide in the presence of an acid catalyst. The product of this reaction is an equilibrium mixture in which at least about 20% of the active oxygen present is in the form of unreacted hydrogen peroxide. Since in many cases hydrogen peroxide does not participate directly in the oxidation of organic compounds, this active oxygen is often wasted.

A method of preparing a non-detonable peracetic acid solution which is free of hydrogen peroxide is described by J. E. Bludworth in U.S. Pat. No. 2,314,385, wherein excess acetaldehyde is reacted with air or oxygen at temperatures of about 195° C., thereby forming a vaporous product containing peracetic acid and excess acetaldehyde. Since peracetic acid reacts very quickly with acetaldehyde in the liquid phase to form acetic acid, the vaporous product must be condensed in the presence of a solvent for peracetic acid under conditions which allow simultaneous separation of the acetaldehyde by fractionation. The resulting peracetic acid-solvent solution is then used in the oxidation of organic materials. Recent improvements in the peroxidation of acetaldehyde have made this an attractive method of preparing preformed peracetic acid for use in the oxidation of organic materials.

Another recently developed method of producing a non-detonable peracetic acid solution which is substantially free of hydrogen peroxide is described by C. J. Wenzke et al. in application Ser. No. 185,063, filed Apr. 4, 1962, now abandoned, entitled "Method of Producing Peracids." This method involves the formation of peracetic acid by the reaction of hydrogen peroxide and acetic acid in the presence of about 5–20% by weight of a strong water-entraining acid such as sulfuric acid, and about 20–75% by weight of water at a temperature of about 20–80° C. The reaction pressure is reduced sufficiently to cause distillation of a non-detonable peracetic acid solution containing no sulfuric acid and essentially no hydrogen peroxide. The condense distillate containing peracetic acid, acetic acid, and water is then used in the oxidation of organic materials.

At present, the preferred method of oxidizing organic materials involves the preformed peracetic acid technique using a peracetic acid solution formed by either of the latter two methods described above. Although this oxidation technique is less expensive, does not require strong acids, and gives extremely good results, it has the disadvantage that it involves the recovery and storage of potentially hazardous peracetic acid solutions which is not required when using the in situ oxidation technique.

SUMMARY OF THE INVENTION

We have now discovered that the oxidation of organic materials with preformed peracetic acid can be more economically and safely performed by contacting the oxidizable organic material at a temperature of 0–250° C. with a vaporous effluent containing at least 5% by weight of peracetic acid coming directly from a peracetic acid generator. Quite surprisingly, when contacting the oxidizable organic material directly with peracetic acid vapors, the oxidation reaction takes place sufficiently fast that the peracetic acid is rapidly removed from the vapor stream and converted to acetic acid by reaction with the organic material. The oxidation process of this invention is more economical than prior preformed peracetic acid techniques since it eliminates the separate step for condensing the peracetic acid vapors from the generator prior to the oxidation step. It is also less hazardous because it does not require the recovery and storage of potentially hazardous peracetic acid solutions.

DESCRIPTION OF THE INVENTION AND THE PREFERRED EMBODIMENTS

Figure 1:
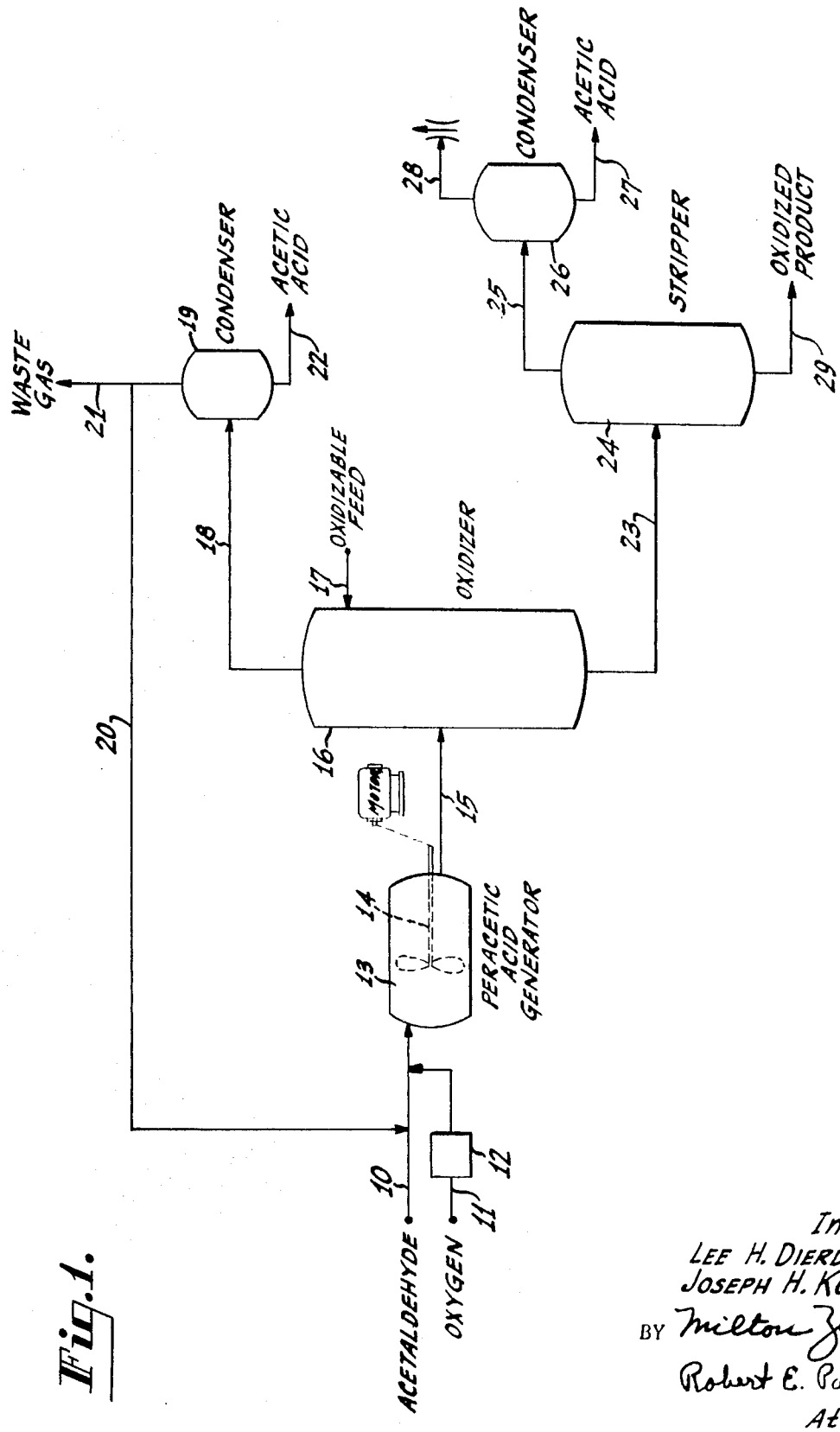
FIG. 1 illustrates a flow diagram of one embodiment of this invention in which the peracetic acid vaporous effluent is generated by the peroxidation of acetaldehyde.

The vaporous effluent containing peracetic acid which is used as the oxidizing medium in accordance with this invention may be generated by either of the latter two methods discussed above, that is, by the vapor phase peroxidation of acetaldehyde or by the peroxidation of acetic acid under distillation conditions. When the peracetic acid vapors are generated by the peroxidation of acetaldehyde, acetaldehyde and oxygen are charged into a suitable generator having a recycle system to provide back mixing of the reaction gases at a temperature of about 120–200° C. The oxygen may be introduced as air, oxygen-enriched air, or substantially pure oxygen. The reaction is conducted in the presence of sufficient diluent, such as excess acetaldehyde and inert gases introduced with the oxygen, that the reaction vapors are not detonable. Residence time in the generator is generally no more than about one minute. The reaction may be catalyzed by the introduction of ozone, if desired. In this manner acetaldehyde is continuously peroxidized to produce an effluent stream containing peracetic acid, unreacted acetaldehyde, small amounts of unreacted oxygen, some acetic acid, and any inert gas such as nitrogen which is introduced with the oxygen. Improved methods of generating peracetic acid by this reaction are fully described in British Pats. Nos. 892,631 and 892,632 and French Pat. No. 1,310,222.

The concentration of peracetic acid in the vaporous effluent from the acetaldehyde peroxidizer will vary depending upon the ratio of acetaldehyde and oxygen charged, the percent conversion, and the amount of diluent present. Although the concentration of peracetic acid in the product vapors can theoretically be varied from nominal amounts to almost 100%, as a practical matter, the vaporous effluent should not contain more than about 55% by weight of peracetic acid since mixtures containing higher percentages may be detonable. The vaporous effluent should, however, contain at least about 5% by weight of peracetic acid to provide a reasonably active oxidizing medium. Preferably, the effluent stream should contain about 10–40% by weight of peracetic acid.

When the peracetic acid vapor stream is generated by the peroxidation of acetic acid, a reactor containing about 5–20% by weight of a water-entraining strong acid catalyst is continuously charged with hydrogen peroxide, acetic acid, and water in a predetermined ratio. With the reaction temperature in the range of about 20–80° C., and preferably about 30–60° C., and the pressure in the range of about 15–350, and preferably about 20–130 millimeters of mercury, the reaction conditions are adjusted to cause distillation of the reaction medium thereby forming a vaporous effluent containing peracetic acid, acetic acid, water, and only minor amounts of hydrogen peroxide. The residence time of the continuously charged reactants in the reactor will normally be about 10–60 minutes, and preferably about 10–30 minutes.

The acetic acid may be introduced either in aqueous solution at concentrations of about 50% by weight or higher, or in anhydrous form as either the acid or the corresponding anhydride. Hydrogen peroxide is generally introduced in aqueous solution at a concentration of about 20–100%, and preferably about 35–55% by weight. Normally, all of the water is introduced in admixture with the acetic acid and/or the hydrogen peroxide. However, when highly concentrated acetic acid and hydrogen peroxide are used, the water may be added separately.

The water-entraining strong acid, which preferably is sulfuric acid, is normally introduced as the concentrated acid. Other catalytic water-entraining acids which may be used include strong acids which boil above about 150° C. at atmospheric pressure, such as orthophosphoric acid, meta-phosphoric acid, alkyl and aryl sulfonic acids, trifluoroacetic acid, cation exchange resins such as the sulfonated styrene-divinylbenzene copolymers, and the like. The water-entraining strong acid can also be formed in situ by the addition of sodium sulfate, molybdenum sulfate, or calcium sulfate together with any strong acid which boils above 150° C.

The ratio at which acetic acid, hydrogen peroxide, and water are continuously charged to the reactor will determine the compositions of equilibrium mixture in the reactor and ultimately the composition of the vaporous effluent. These ratios may be varied over relatively wide limits while still providing a vaporous effluent which is not detonable. The amount of acetic acid charged to the reactor may vary from about 4–97%, and preferably about 8–90%, the amount of hydrogen peroxide from about 2.5–36%, and preferably about 5–28%, and the amount of water from about 0.3–94%, and preferably about 5–87% by weight of the total reactants being continuously charged. Within these limits, each of these three reactants must be co-ordinated so as to maintain the concentration of peracetic acid in the vaporous effluent within the safe and useful range of about 5–55%, and preferably about 10–40% by weight. The weight relationships between these three reactants which result in safe and useful vaporous effluents are illustrated by the triangular co-ordinate graph in FIG. 3 of the drawings. These safe and useful relationships are those which fall on the graph within the area circumscribed by the solid line. Thus, when charging each of these three reactants in the weight percent defined by any point within this area, the resulting vaporous effluent will be safe and useful. The preferred relationships are those falling within the area circumscribed by the dotted line.

The simplest procedure for starting-up this peracetic acid generator is to charge the strong acid catalyst along with sufficient water to fill the reactor to the desired liquid level. The temperature and pressure are then adjusted to cause distillation of the medium. When the generator begins to discharge a vaporous stream, continuous charging of the three reactants in the desired ratio is begun. At first the product vapors will consist almost entirely of water with the concentration of acetic acid and peracetic acid slowly increasing until a constant equilibrium mixture is reached in the reactor. The exact composition of this equilibrium mixture will be determined by the ratio at which the reactants are being charged and the amount of strong acid catalyst present.

When the final equilibrium mixture in the reactor can be predetermined, the generator start-up time can be materially reduced by initially charging the reactor with acetic acid, hydrogen peroxide, water, and strong acid in the ratio which will directly give the desired equilibrium mixture. When all of the reactants and catalyst have been charged, they should be allowed to react for about 10–60 minutes at about 20–80° C. until equilibrium has been reached. Thereafter, the pressure is reduced to about 15–350 millimeters of mercury and evolution of a vaporous effluent initially containing the desired concentration of peracetic acid begins.

In accordance with this invention, the organic material to be oxidized is contacted with the vaporous effluent coming directly from a peracetic acid generator. Typical oxidation reactions which may be carried out in accordance with this invention include epoxidation and hydroxylation of ethylenically unsaturated organic compounds, oxidation of sulfur-containing organic compounds, oxidation of nitrogen-containing organic compounds, oxidation of cyclic ketones, oxidation of aromatic compounds and the bleaching of many discolored organic materials.

Ethylenically unsaturated organic compounds containing at least one ethylenic double bond in which the atoms bonded directly to the ethylenic carbon atoms are selected from the group consisting of hydrogen and carbon may be epoxidized or hydroxylated in accordance with this invention. Typical ethylenically unsaturated organic compounds include unsaturated glycerides such as soybean oil, safflower oil, corn oil, cotton seed oil, olive oil, castor oil, peanut oil, tall oil, tung oil, tallow, menhaden oil, and linseed oil; unsaturated fatty acids such as soya, oleic, linoleic, linolenic, elaidic, erucic, eleostearic, myristoleic, palmitoleic, licanic, ricinoleic, arachidonic, clupanodonic, hendecenoic, cotton seed oil fatty acid, peanut oil fatty acid, tall oil fatty acid, tung oil fatty acid, and tallow fatty acid; other unsaturated acids such as vinylacetic acid and crotonic acid; alkyl esters of unsaturated fatty acids such as methyl, butyl, and hexyl oleates, linoleates, linolenates, soyoates, cottonates, tallates, elaidates, erucates, eleostearates, myristoleates, palmitoleates, licanates, ricinoleates, arachidonates, clupandodonates and hendecenoate; unsaturated fatty alcohols such as oleyl, linoleyl, linolenyl, elaidyl, erucyl, eleostearyl, myristoleyl, palmitoleyl, licanyl, ricinoleyl, arachidonyl, clupanodonyl and hendecenyl; other unsaturated alcohols such as allyl, methallyl, and crotonyl alcohols; sterols such as cholesterol, ergosterol, sitosterol, and taraxasterol; unsaturated alcohol esters such as diallyl carbonate, allyl acetate, allyl methacrylate, crotyl acrylate, diallyl maleate, diethylene glycol bis(allyl carbonate), diallyl phthalate and dimethallyl phthalate; olefinic hydrocarbons including the alpha olefins derived from wax and petroleum cracking processes, ethylene polymerization processes, and natural fat reduction processes such as propylene, butenes, butadiene, pentenes, 1-hexene, 3-hexene, 1-heptene, 1-octene, 2-octene, diisobutylene, 1-nonene, 1-decene, limonene, pinene, myrcene, camphene, 1-undecene, 1-dodecene, 1-tridecene, 1-tetradecene, 1-pentadecene, 1-hexadecene, 1-heptadecene, 1-octadecene, 1-nonadecene, 1-eicosene, and propylene trimer and tetramer, as well as polymers and copolymers of dienes such as polybutadiene, styrene-butadiene copolymers, and polycyclopentadiene; unsaturated aromatic hydrocarbons such as styrene, α-methyl styrene, divinyl benzene, indene and stilbene; cyclic olefinic hydrocarbons such as cyclohexene, cyclooctadiene, cyclododecadiene, dicyclopentadiene, dipentene and vinylcyclohexene; unsaturated ethers such as diallyl ether, butyl crotyl ether, and allylphenyl ethyl ether; unsaturated ketones such as methyl allyl ketone, and methyl pentenyl ketone; and unsaturated halogenated hydrocarbons such as allyl chloride, allyl bromide, crotyl chloride, methallyl chloride, and dichlorobutene. In other words, any ethylenically unsaturated compound which can be epoxidized or hydroxylated with peracetic acid can be oxidized in accordance with this invention.

Compounds possessing certain sulfur-containing functional groups can also be oxidized in accordance with this invention. Typical examples of suitable sulfur-containing organic compounds include sulfides such as p,p'-dichlorobenzyl sulfide, diphenyl sulfide, dibenzothiophene, isopropyl disulfide, and dibenzyl disulfide which may be oxidized to the corresponding sulfoxides; sulfoxides such as p,p'-dichlorobenzyl sulfoxide, diphenyl sulfoxide dibenzothiofuran sulfoxide, isopropyl-2-propanethiosulfinate, and dibenzyl disulfoxide which may be further oxidized to the corresponding sulfones. In other words, any organic sulfide or sulfoxide which can be oxidized with peracetic acid can be oxidized in accordance with the improved process of this invention.

Compounds possessing certain nitrogen-containing functional groups may also be oxidized in accordance with this invention. Typical examples of suitable nitrogen-containing organic compounds include primary amines such as cyclohexylamine and dicyclohexylamine which may be oxidized to the corresponding nitroso-compounds and further oxidized to the nitro-compounds, and aniline, sec-butylamine, t-butylamine and p-phenylenediamine which give the corresponding nitro-compounds directly; tertiary amines such as triethylamine, lauryldimethylamine, pyridine, 2-chloropyridine, quinoline, N,N,N',N'-tetramethyl-p-phenylenediamine, N-methylpiperidine, and 8-hydroxyquinoline which may be oxidized to the corresponding amine oxides; nitroso-compounds such as nitrosobenzene which may be oxidized to nitrobenzene; nitrosamines such as di-isopropyl nitrosamine which may be converted to the corresponding nitramine; oximes such as diethyl ketoxime which yields 3-nitropentane; Schiff bases such as the one formed from acetone and isopropylamine which may be oxidized to 2-isopropyl-3,3-dimethyl-oxazirane initially and by further oxidation to the nitroso-alkane dimer; azo-compounds such as azobenzene which yields azoxybenzene; and phenylhydrazones such as acetaldehyde phenylhydrazone which yields the azoxy derivative. In other words, any amine, nitrosocompound, nitrosoamine, oxime, Schiff base, oxazirane, azocompounds, or phenylhydrazone which can be usefully oxidized with peracetic acid can be oxidized in accordance with the improved process of this invention.

Other oxidation reactions such as the oxidation of cyclic ketones to the lactones and the oxidation of phenol to benzoquinone can be carried out by the process of this invention. Suitable cyclic ketones include cyclopentanone, cyclohexanone, and camphor.

This process is also suitable for the bleaching of many natural and synthetic organic materials by oxidation with peracetic acid. Typical examples of materials which may be bleached by the process of this invention include textiles such as nylon, cotton, rayon, cellulose acetate, and polyesters; other cellulose products such as solid and veneer wood and wood pulp for paper manufacture; waxes such as carnauba, bees, candelilla, ozokerite and montan; and oils including vegetable, animal, and minerla oils such as castor, corn, soya, fish menhaden, and lubricating oils. In other words, any organic material which can be bleached by conventional liquid phase oxidation with peracetic acid can be bleached in accordance with the novel oxidation process of this invention.

The novel oxidation process of this invention is carried out by passing the peracetic acid vaporous effluent coming directly from a peracetic acid generator into a body of the organic material to be oxidized at a temperature of 0–250° C. The oxidizable organic material may be in the form of a liquid body, a mist, a vapor stream, or solid material. In other words, the peracetic acid vapors can be bubbled into a liquid body of the oxidizable organic material, passed over a surface on which the oxidizable material is spread as a film, contacted with a stream of vaporized or atmoized oxidizable organic material, passed over the surface of an impervious solid such as wood stock, or passed through a porous solid such as fabric. When the oxidizable organic material is liquid, a convenient contacting procedure is to use a fractionating column packed with Raschig rings, helices, or saddles through which the peracetic acid vapors and the oxidizable organic material are passed in either cocurrent or countercurrent contact.

For the practice of this invention, ovidation temperatures in the range of about 0–250° C. may be used. Temperatures below about 0° C. are not satisfactory since no substantial amount of oxidation takes place at these temperatures. Temperatures above about 250° C. should be avoided since they may cause the peracetic acid vapors to be sweep out of the oxidation zone before they have a chance to substantially react, and the acetic acid present may tend to strongly attack the oxidation product at these temperatures.

The preferred temperature for the oxidation reaction is about 50–200° C. When using temperatures below about 50° C., rapid separation of acetic acid from the liquid medium by vaporization does not occur. When the peracetic acid vaporous effluent is derived from acetaldehyde, temperatures below about 25° C. have the added disadvantage that substantial amounts of unreacted acetaldehyde may be absorbed by the oxidizable organic material causing excessive losses of peracetic acid via reaction with acetaldehyde. At temperatures above about 200° C., the acetic acid may materially attack the oxidized product; however, in the case of hydroxylation this may be desirable.

Pressure on the oxidation reaction can be varied over wide limits ranging from below atmospheric to superatmospheric pressures. When a pressure below about 600 millimeters of mercury is employed, much of the by-product acetic acid can be distilled from the reaction zone as it is formed, even at temperatures as low as about 50° C. When the peracetic acid vaporous effluent is derived from acetic acid, subatmospheric pressures of about 15–350 and preferably about 20–130 millimeters of mercury are generally utilized. When superatmospheric pressures are employed, the major part of the by-product acetic acid will tend to remain with the oxidized product and can be removed from it in a subsequent refining step.

The peracetic acid generator, the oxidation zone, their components such as stirrers and packing, and all other surfaces which come in contact with the peracetic acid should be constructed of inert materials which do not catalyze the decomposition of peracetic acid. Suitable materials of construction include aluminum, certain types of stainless steel, tantalum, zirconium, tin, glass, quartz, ceramics, and many types of plastics. However, when peracetic acid is generated by the peroxidation of acetic acid, the generator should not be constructed of aluminum since this metal is attacked by the strong acid used therein. All exposed surfaces should be thoroughly cleaned and free of contaminating materials prior to use. Certain materials, even in small quantities, are highly catalytic towards peracetic acid, causing it to decompose into acetic acid and oxygen, and thus must be specifically excluded. Among these materials are metals such as iron, cobalt, copper, zinc, silver, and lead.

The reaction time required for the novel oxidation process of this invention is essentially the same as that previously required for corresponding liquid phase oxidations with peracetic acid. We have found that by continuously supplying peracetic acid at a rate sufficient to provide the desired amount of oxidation within the residence time of the oxidizable organic material in the oxidation zone, peracetic acid is rapidly removed from the vaporous effluent by reaction with the oxidizable organic mamaterial. Thus, the hazards associated with prior processes due to the recovery and storage of peracetic acid are completely avoided by the process of this invention. The process of this invention also avoids the separate step of condensing peracetic acid vapors coming from the peracetic acid generator prior to the oxidation reaction.

The oxidation procedure of this invention is particularly advantageous when using a vaporous effluent generated by the peroxidation of acetaldehyde. Since acetaldehyde reacts with peracetic acid in the liquid phase, prior processes have required that these two components of the vaporous effluent be physically separated by condensing the peracetic acid in a solvent under conditions which do not condense the acetaldehyde. As a result, it has heretofore been necessary to employ a peracetic acid-solvent solution in subsequent oxidation reactions. In accordance with this invention, we have found that by contacting the oxidizable organic material with a vaporous effluent coming directly from a peracetic acid generator, peracetic acid is removed from the vaporous effluent sufficiently fast that the sharp physical separation of peracetic acid and acetaldehyde required by prior processes not necessary. Thus, by eliminating the necessity of using a special solvent for the peracetic acid, the process of this invention eliminates the expense of the solvent, the equipment necessary to condense the peracetic acid in the solvet, and the recovery step necessary to remove the solvent from the oxidized product. Moreover, the process of this invention allows the oxidation of the organic material to be conducted in the absence of a solvent, which in most cases leads to a superior result.

Referring now to FIG. 1 of the drawing, peracetic acid vapors are generated in reactor 13 by reaction of acetaldehyde, supplied through line 10, and oxygen or an oxygen-containing gas such as air, supplied through line 11. Ozone may be added to the oxygen stream, if desired, as it passed through ozonizer 12. Back mixing of the reacting gases is provided by motor driven fan 14. The vaporous effluent from reactor 13, containing at least 5% by weight of peracetic acid, is charged through line 15 to oxidizer 16 where it contacts an oxidizable organic feed being introduced to the oxidizer through line 17. The type of oxidizer employed will depend primarily upon the type of organic material being oxidized.

When the oxidizable organic material is a liquid, oxidizer 16 is preferably a packed fractionating column. The peracetic acid vapors are preferably introduced at an intermediate position in the oxidation column. If the vaporous effluent is introduced too close to the top of the column, it may pass through the liquid before any substantial amount of peracetic acid has been removed. On the other hand, if the peracetic acid is introduced too close to the bottom of the column, the oxidizable organic material may not remain in the oxidation zone long enough after contact with the vaporous effluent to completely react with any peracetic acid which may have been absorbed. Uncondensed vapors are removed from oxidizer 16 via line 18 and passed to condenser 19 wherein all materials less volatile than acetaldehyde, primarily glacial acetic acid, are condensed. Glacial acetic acid is recovered from condenser 19 via line 22 and unreacted acetaldehyde is recycled to the peracetic acid generator via line 20. A portion of the uncondensed gases can be removed from the system via line 21, if desired, to prevent a build-up of inert gases.

When the oxidation process involves the bleaching of a solid material such as cloth, or wood, it is generally desirable to have two or more oxidizers which can be used alternately, thus providing an off cycle for loading and unloading the oxidizers. In this case, it is preferable that the temperature in oxidizer 16 is maintained above the vaporization temperature of peracetic acid so that there is no liquid condensation in the oxidizer. The total effluent from oxidizer 16 is passed to condenser 19 via line 18 and substantial quantities of glacial acetic acid are recovered via line 22.

When the material being oxidized is an organic liquid, the oxidized product is removed from oxidizer 16 and passed to stripper 24 via line 23. If the temperature in oxidizer 16 is below the vaporization temperature of acetic acid, the oxidized product will contain substantial amounts of acetic acid. Acetic acid is removed from the oxidized product in stripper 24 and passed overhead via line 25 to condenser 26 wherein glacial acetic acid is condensed and recovered via line 27. Vacuum for the stripping operation is provided via line 28. Substantially pure oxidized organic product is recovered from stipper 24 via line 29.

Figure 2:
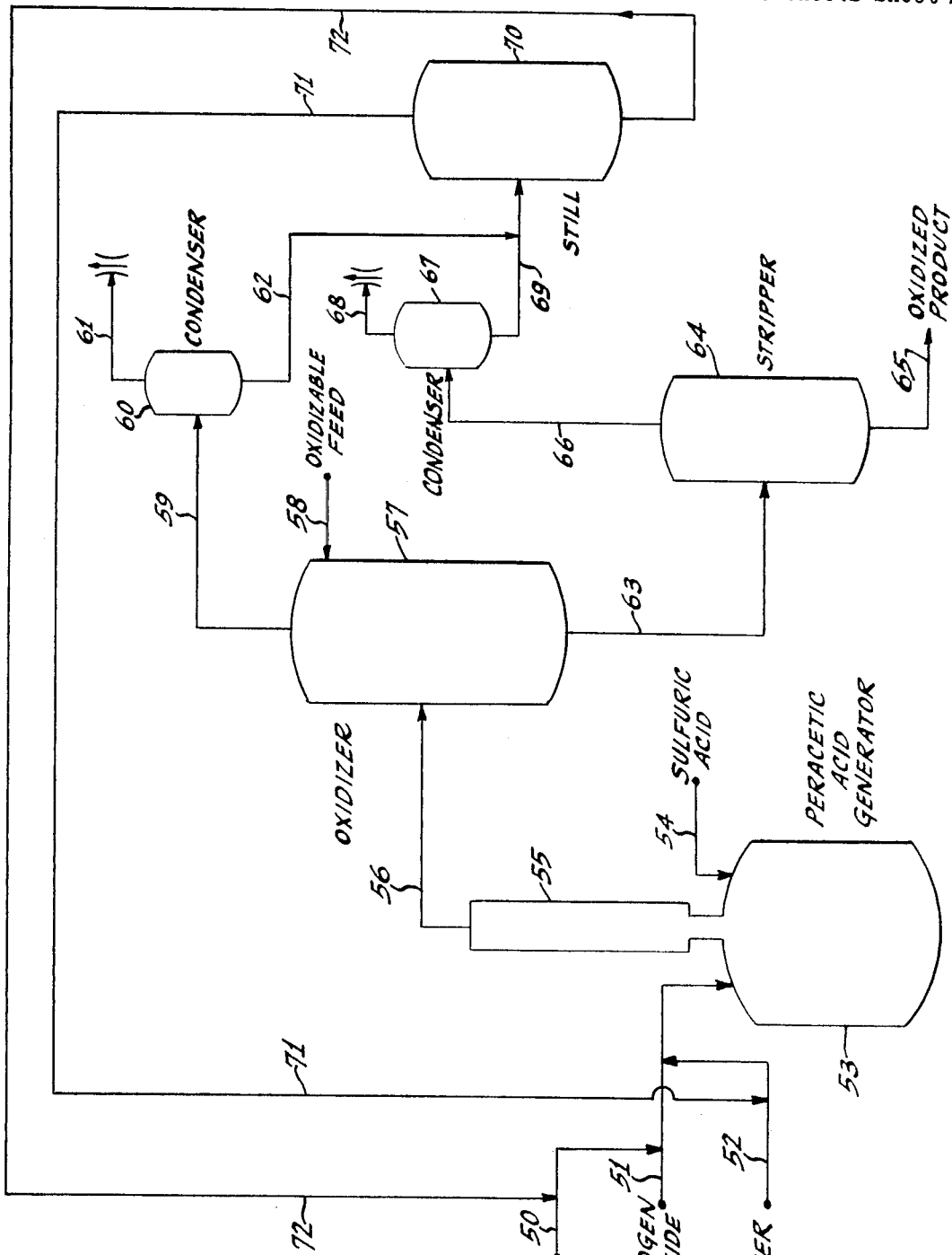
FIG. 2 illustrates a flow diagram of another embodiment of the invention in which the peracetic acid vaporous effluent is generated by the peroxidation of acetic acid.
Figure 3:
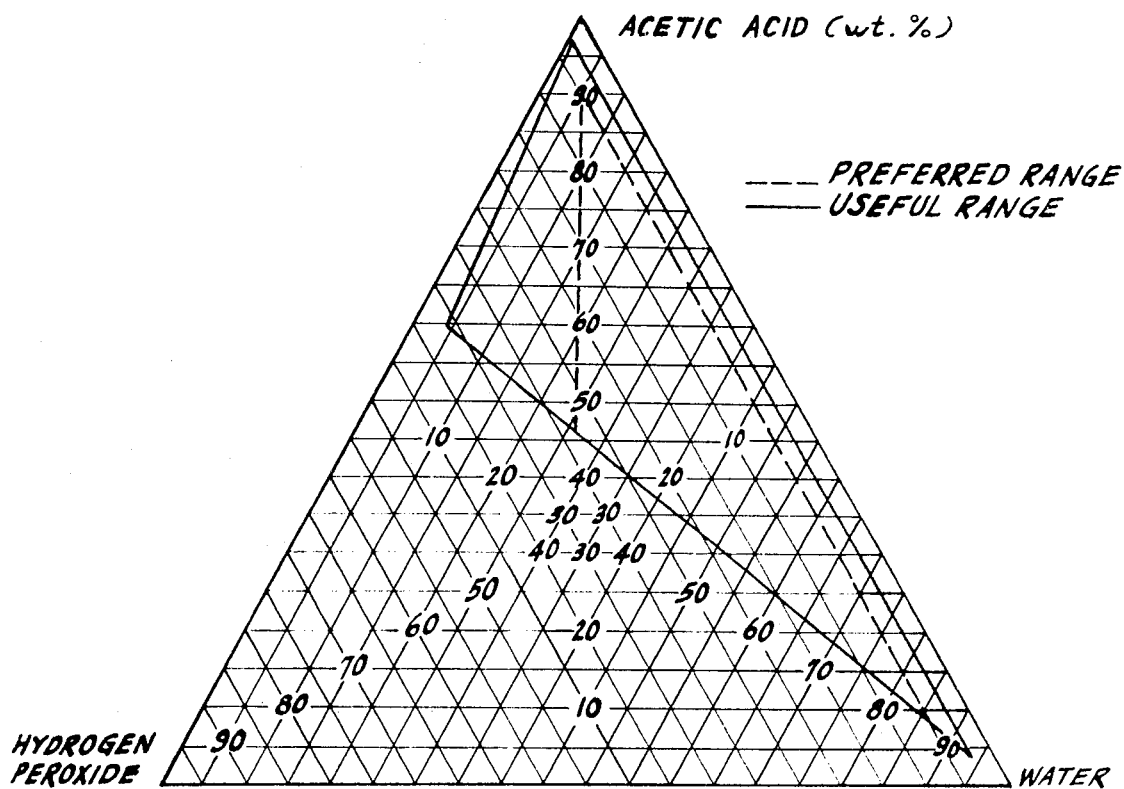
FIG. 3 is a triangular coordinate graphic illustration of suitable ratios of acetic acid, hydrogen peroxide and water which can be continuously charged to a peracetic acid generator to give a useful product which is nondetonable, free of strong acid catalyst, and substantially free of hydrogen peroxide.

Referring now to FIG. 2, acetic acid, hydrogen peroxide, and water are continuously charged to reactor 53 via lines 50, 51 and 52, respectively, at a safe and useful ratio as determined from the graph in FIG. 3. Sulfuric acid is initially charged to reactor 53 via line 54 when starting up the generator. With a temperature in the range of about 20–80° C. and a pressure in the range of about 15–350 millimeters of mercury, distillation conditions are maintained in reactor 53. The vapors produced therein are passed through rectifying column 55, where any entrained sulfuric acid is separated from the peracetic acid, acetic acid, and water vapors and returned to reactor 53. When the acetic acid content of the equilibrium mixture in reactor 53 is sufficiently high that no sulfuric acid is entrained in the vaporous effluent, rectifying column 55 can be eliminated. A vaporous stream containing the desired amount of peracetic acid, acetic acid, and water passes through line 56 to oxidizer 57. The organic material to be oxidized is introduced into oxidizer 57 via line 58. Operation of oxidizer 57 is essentially the same as previously described for oxidizer 16 in FIG. 1.

Uncondensed vapors from oxidizer 57 pass through line 59 to condenser 60 wherein all condensable materials are recovered. The vacuum necessary to provide reduced pressure in the generator and oxidizer system is provided via line 61. Condenser material, primarily aqueous acetic acid, is removed from condenser 60 via line 62.

Oxidized product, along with any aqueous acetic acid, is removed from oxidizer 57 and passed via line 63 to stripper 64. Aqueous acetic acid is removed from the oxidized product in stripper 64 and passed overhead to condenser 67 via line 66. Vacuum for the stripping operation is provided via line 68. Substantially pure oxidized product is recovered from stripper 64 via line 65. Aqueous acetic acid vapors are condensed in condenser 67 and passed to still 70 via line 69, along with the aqueous acetic acid stream coming from condenser 60 via line 62. Water and acetic acid are separated in still 70, the water being passed overhead and recycled for reuse in the process via line 71. The acetic acid remaining in still 70 is recycled to the process via line 72.

The following examples, illustrating specific embodiments of the novel process disclosed herein, are given without any intention that the invention be limited thereto. All parts and percentages are by weight unless otherwise specified.

EXAMPLE 1

Acetaldehyde was reacted continuously with oxygen at 160° C. in an agitated aluminum reactor using a small amount of ozone as catalyst to produce a vaporous effluent containing approximately 19 mole percent peracetic acid, 78 mole percent acetaldehyde, and 3 mole percent oxygen. Peracetic acid was produced in this manner at a rate of approximately 608 parts/hr.

The hot effluent stream from the generator was passed through a short aluminum tube into an agitated glass reactor which contained 500 parts of soybean oil (iodine number 135) maintained at a temperature of 125° C. and atmospheric pressure. After bubbling the vaporous effluent into the soybean oil for 30 min., the product was distilled free of acetic acid under vacuum to yield 540 parts of epoxy soybean oil containing 6.65% oxirane oxygen and having an iodine number of 1.3.

EXAMPLE 2

The effluent stream from the acetaldehyde peroxidizer of Example 1 was passed into an agitated reactor containing 500 parts of a $C_{11}$–$C_{15}$ alpha-olefin fraction (iodine number 149) obtained by a thermal cracking and fractionation process from petroleum wax. After contacting the olefin fraction at 100° C. for 75 min. with the effluent stream, the epoxidized product was vacuum stripped free of acetic acid to yield 550 parts of $C_{11}$–$C_{15}$ olefin epoxide having an oxirane oxygen content of 7.12% and an iodine number of 4.4.

EXAMPLE 3

Five hundred parts of alkali-refined menhaden oil (iodine number 190) was contacted for 1 hr. at 155° C. with the aldehyde peroxidizer effluent stream of Example 1. The epoxidized product, after removal of by-product acetic acid, had an oxirane oxygen content of 8.33% and an iodine number of 5.0.

EXAMPLE 4

The acetaldehyde peroxidizer effluent stream of Example 1 was passed for 30 min. into 250 parts of n-butyl oleate which was held at 90° C. The epoxidized product, when freed of acetic acid, analyzed 4.31% oxirane oxygen and had an iodine number of 2.1.

EXAMPLE 5

Five hundred parts of d-limonene was epoxidized at 100° C. by contacting in a stirred aluminum reactor with the acetaldehyde peroxidizer effluent stream of Example 1. After 30 min. of reaction, the purified product analyzed 9.80% oxirane oxygen. Similar epoxidation of d-limonene at 125° C. for 35 min. yielded a product containing 10.21% oxirane oxygen.

EXAMPLE 6

One thousand parts of dodecene-1 was epoxidized at 125° C. by contacting with the acetaldehyde peroxidizer effluent stream of Example 1 for a total of 100 min. The purified product contained 7.42% oxirane oxygen and had an iodine number of 3.1.

EXAMPLE 7

The vaporous effluent from the acetaldehyde peroxidizer of Example 1 was passed for 35 min. into a stirred reaction flask which contained 1000 parts of pentaerythritol tetratallate (iodine number 112) and was held at 60° C. under an absolute pressure at 600 mm. Hg. After removal of acetic acid, the epoxidized product contained 5.21% oxirane oxygen and had an iodine number of 5.1.

EXAMPLE 8

The effluent stream from the acetaldehyde peroxidizer of Example 1 was connected into an inlet port near the middle section of a jacketed aluminum column having a length 30 times its diameter and packed with aluminum Raschig rings. The temperature in the column was controlled by steam and water flow through the jacket. The column was provided at the top with a vapor exit line and an inlet port through which the feed could be admitted. The bottom of the column was provided with an outlet line for epoxidized product and by-product acetic acid. The feed which consisted of 1000 parts/hr. of soybean oil (iodine number 135) was fed continuously into the top of the column and allowed to flow downward by gravity as the acetaldehyde peroxidizer vaporous effluent was continuously passed into the middle inlet port, thus causing countercurrent contacting of the olefin with the vaporous effluent while maintaining the column temperature at 70° C. After being freed of by-product acetic acid, the product stream removed from the bottom of the column contained 1080 parts/hr. of epoxy soybean oil analyzing 6.60% oxirane oxygen and having an iodine number of 0.7.

EXAMPLE 9

A $C_{11}$–$C_{15}$ alpha-olefin fraction having an iodine number of 149 was fed at the rate of 1200 parts/hr. into the top of the epoxidation column described in Example 8 which was held at 90° C. An acetaldehyde peroxidizer vaporous effluent containing 532 parts/hr. of peractic acid was fed simultaneously into the middle inlet port of the column. The epoxidized product was continuously removed from the bottom of the column and, after being freed of by-product acetic acid, was found to contain 1325 parts/hr. of epoxidized olefin having an oxirane oxygen content of 7.50% and an iodine number of 3.0.

EXAMPLE 10

Acetaldehyde was oxidized continuously with air in an aluminum reactor at 180° C. using ozone as catalyst to produce a vaporous effluent containing approximately 12.5 mole percent peracetic acid, 35 mole percent acetaldehyde, 50 mole percent nitrogen, and 2 mole percent oxygen. Peracetic acid was produced in this manner at the rate of 456 parts/hr.

A 400 part sample of soybean oil (iodine number 135) was placed in a stirred glass reactor equipped with an inlet tube for the vaporous effluent stream, temperature controls, and a condensing and receiving system for the recovery of excess acetaldehyde. The vaporous effluent from the peracetic acid generator was continuously passed into the reactor for a total of 65 min. while maintaining the temperature at 90° C. After this time, the reaction mixture was vacuum distilled to yield 320 parts of pure acetic acid as distillate, and 442 parts of epoxy soybean oil containing 6.65% oxirane oxygen and having an iodine number of 0.8 as bottoms product. The condensate in the acetaldehyde recovery receiver was distilled to yield an additional 250 parts of pure acetic acid.

EXAMPLE 11

Five hundred parts of methyl tallate (methyl ester of purified tall oil fatty acid, iodine number 125) was contacted at 115° C. with the acetaldehyde peroxidizer vaporous effluent of Example 10 containing 456 parts/hr. of peracetic acid. After 25 min. of reaction, the epoxidized product analyzed, when freed of acetic acid, 4.77% oxirane oxygen. After 30 min. of reaction, the oxirane content had increased to 5.06%, and after 40 min. to 5.40%.

EXAMPLE 12

The vaporous effluent coming directly from the acetaldehyde peroxidizer of Example 1 was passed for 0.5 hr. into 800 parts of dimethyldodecylamine which was held at 90° C. The oxidized product, when stripped free of acetic acid, yielded 850 parts of a hygroscopic white solid having a melting point of 115–120° C.

EXAMPLE 13

Four hundred and fifty parts of butyl sulfide was contacted for 45 min. at 110° C. with the vaporous effluent coming directly from the acetaldehyde peroxidizer described in Example 1. The oxidized product, when freed of acetic acid, was a light yellow solid having a melting point of 42–45° C.

EXAMPLE 14

Peracetic acid vapors were prepared by continuously charging a mixture containing 46% glacial acetic acid, 24% hydrogen peroxide and 30% water to a peracetic acid generator pot initially containing 18.9% glacial acetic acid, 31.8% hydrogen peroxide, 39.3% water and 10.0% sulfuric acid. The continuous generation and distillation of peracetic acid was carried out at 55° C. and 42 mm./Hg pressure. The vaporous effluent contained 50% peracetic acid and provided 176 parts/hr. of peracetic acid.

The vaporous effluent coming directly from the generator was passed through a vertical glass column containing 100 parts of soybean oil (iodine number 134). After 75 min., the epoxidation was stopped. The reacted soybean oil was washed free of residual peroxygen and was dried in a rotating evaporator. The resulting product had an oxirane oxygen content of 6.9% and an iodine number of 4.4.

EXAMPLE 15

Peracetic acid vapors were prepared by continuously metering a mixture containing 40% glacial acetic acid, 24% of 50.2% aqueous hydrogen peroxide and 36% water to a peracid generator pot initially containing 19.6% glacial acetic acid, 28.8% of 50.2% aqueous hydrogen peroxide, 30.8% water, and 20.8% of 96% aqueous sulfuric acid. Generation and distillation of peracetic acid was carried out at 50° C. and 54 mm./Hg pressure. The resulting vaporous effluent contained 24% peracetic acid and provided peracetic acid at the rate of 461 parts/hr.

The peracetic acid vapors coming directly from the peracetic acid generator were allower to rise through a column contacting a falling mist of a $C_{14}$–$C_{16}$ alpha-olefin fraction having a bromide number of 84. The mist was produced by passing the olefin at a temperature of 50° C. and a pressure of 100 p.s.i. through a stainless steel spray nozzle. After a contact time of 3 min., 125 parts of olefin were epoxidized to a product having an oxirane oxygen content of 0.3% and a bromine number of 76.

EXAMPLE 16

By running the peracetic acid generator of Example 14 at a lower temperature, a 50% peracetic acid vaprous effluent containing 35.7 parts/hr. of peracetic acid was obtained. One hundred parts of Hodag ester A–115 (very dark brown) was heated to 59° C. in a vertical glass column and the peracetic acid vapors coming directly from the peracetic acid generator were passed through the oil for a 21 min. period. The oil, after washing with water and drying, was light yellow and exhibited an improvement in odor.

EXAMPLE 17

By using the peracetic acid generator of Example 14, a 50% peracetic acid vaporous effluent containing 130 parts/hr. of peracetic acid was obtained. Eleven parts of dry, unbleached cotton cloth was saturated with water and placed in the vertical glass column. After 43 min., bleaching was stopped and the cloth was water washed. An acceptable reflectance reading of 84.3 was obtained.

EXAMPLE 18

By using the peracetic acid generator of Example 14, a 50% peracetic acid vaporous effluent containing 100 parts/hr. of peracetic acid was obtained. Twenty parts of unbleached bisulfite treated softwood pulp was placed in the vertical glass column. The peracetic acid vapors coming directly from the generator were passed through the pulp for 0.5 hour. After this treatment, the sample was washed with water until free of acid, thickened on a Buchner funnel, and pressed into paper.

This example was repeated using different bleaching temperatures and samples of the same pulp which had been pretreated in different ways. The results are set forth in the following table.

PERACETIC ACID VAPOR BLEACHING OF WOOD PULP

| | | Bleaching | | |
|---|---|---|---|---|
| Sample | Pulp pretreatment | Temp., °C. | Time, min. | Brightness |
| A | None (control) | | | 55.0 |
| B | None | 35 | 30 | 58.9 |
| C | do | 45 | 30 | 60.9 |
| D | Versenex 80 | 45 | 30 | 67.0 |
| E | Na pyrophosphate | 45 | 30 | 69.2 |

As will be apparent to those skilled in the art, numerous modifications and variations of the embodiments illustrated above may be made without departing from the spirit of the invention or the scope of the following claim.

We claim:

1. In the method of epoxidizing soybean oil by reaction with preformed peracetic acid to form epoxidized soybean oil and acetic acid, the improvement which comprises contacting said soybean oil at a temperature of 0–250° C. with a vaporous effluent containing at least 5% by weight of peracetic acid, generated by the peroxidation of acetic acid and coming directly from the peracetic acid generator, thereby producing epoxidized soybean oil and acetic acid.

References Cited

UNITED STATES PATENTS 3,278,562  10/1966  Thigpen et al. _____ 260—348.5
3,321,493   5/1967  Beesley et al. _____ 260—348.5

NORMA S. MILESTONE, Primary Examiner

U.S. Cl. X.R.

260—97.5, 99, 143, 283 R, 289 R, 293.51, 329.3, 333, 343, 343.5, 348.5 L, 396 R, 406, 502 R, 583 D, 583 C, 607 A, 618 C, 631 R, 631.5, 635 R, 644, 645, 647; 8—111